United States Patent [19]

Mathews

[11] 4,177,354
[45] Dec. 4, 1979

[54] GRAPHIC COMMUNICATIONS APPARATUS

[75] Inventor: Max V. Mathews, New Providence, N.J.

[73] Assignee: Bell Telephone Laboratories, Incorporated, Murray Hill, N.J.

[21] Appl. No.: 896,705

[22] Filed: Apr. 17, 1978

[51] Int. Cl.² .............................................. G08C 21/00
[52] U.S. Cl. .................................. 178/18; 250/213 A; 340/707
[58] Field of Search ................ 178/18, 19; 340/324 R, 340/324 M, 707, 708, 795, 796, 365 C; 307/230; 250/213 A

[56] References Cited

U.S. PATENT DOCUMENTS

| 3,522,664 | 8/1970 | Lambright et al. ..................... 178/18 |
| 3,699,439 | 10/1972 | Turner .................................... 178/18 |
| 3,723,977 | 3/1973 | Schaufele ......................... 250/213 A |
| 3,740,734 | 6/1973 | Maldonado ....................... 250/213 A |
| 3,944,740 | 3/1976 | Murase et al. .......................... 178/18 |
| 4,055,726 | 10/1977 | Turner et al. .......................... 178/18 |

FOREIGN PATENT DOCUMENTS 814077  5/1969  Canada ................................ 340/365 C Primary Examiner—Thomas A. Robinson
Attorney, Agent, or Firm—Lucian C. Canepa

[57] ABSTRACT

A light-spot-emitting stylus (21) is utilized by an operator to write graphical information on the surface of a simple multilayer planar transducer device (10) that includes a photoconductive layer (16) sandwiched between a transparent conductive layer (14) and a resistive layer (18) that includes spaced-apart electrodes (23 through 32 . . . ). In response to the writing spot, the transducer device generates electrical output signals indicative of successive coordinate positions of the spot on the transducer surface. In turn, these signals are transmitted to a remote location where the originally written graphical information is reconstructed. Moreover, by positioning the transducer on the face of a display unit (51), the information being written on the transducer can be viewed by the operator during the writing process.

9 Claims, 4 Drawing Figures

GRAPHIC COMMUNICATIONS APPARATUS

TECHNICAL FIELD

This invention relates to apparatus for producing electrical signals representative of the position of a light spot on a surface and, more particularly, to a transducer device that is responsive to graphical information defined by a light-spot-emitting stylus for producing signals coded in accordance with the successive coordinate positions of the light spot on a writing surface of the transducer. Moreover, the invention also relates to a unit associated with the transducer for providing concurrently a display of the graphical information being written on the surface of the transducer.

BACKGROUND ART

Several different types of transducers are known for utilization in graphic communications systems to provide coordinate-position-indicating electrical signals. One type of known transducer, described in U.S. Pat. No. 3,699,439, includes first and second sets of terminals in contact with the edges of a sheet of material having substantially uniform resistivity. Preassigned input electrical signals are alternately applied to the two sets of terminals, and a writing stylus is utilized by an operator to establish direct contact or capacitive coupling to the resistive sheet. In that way successive x- and y-direction output signals indicative of the position of the stylus are provided.

Another type of known transducer is designed to be employed in combination with a light-emitting stylus adapted to be manipulated by an operator to define graphical information on the surface of the transducer. One such transducer is described, for example, in U.S. Pat. No. 3,944,740.

Moreover, the transducer device described in U.S. Pat. No. 3,944,740 is further adapted to be combined with an associated display panel. In that way the graphical information being written into the device by an operator can be viewed during and subsequent to the writing process.

Considerable interest exists on the part of workers in the communications field in providing a light-actuated transducer of the general type described above. An inexpensive and reliable device of this type can provide an attractive way of generating coordinate-position-indicating signals to be inputted to a computer or to be transmitted to a remote location where the graphical input information is to be reproduced. At the same time it is often desired that the graphical information being written into the transducer be viewable locally by the person doing the writing.

SUMMARY OF THE INVENTION

In accordance with one basic aspect of the principles of the present invention, an apparatus for providing electrical signals representative of the coordinate position of a light spot on a writing surface comprises a simple multilayer planar transducer device. In one specific illustrative embodiment, the transducer comprises a layer of a photoconductive material sandwiched between a transparent conductive layer and a layer of a substantially uniformly resistive material. Spaced-apart terminals are disposed along the periphery of the resistive material. By means of these terminals, successive x- and y-direction potentials are established across the resistive layer. A single output terminal is connected to the conductive layer. An incident light spot directed onto the photoconductive layer from the stylus is effective to establish a localized electrical connection between the conductive and resistive layers. For each spot position, a pair of coordinate-position-indicating electrical signals are provided at the specified output terminal of the transducer device.

In accordance with another aspect of the principles of this invention, the aforementioned transducer is combined with a unit capable of displaying in real time the graphical representation being defined on the surface of the transducer by the writing light spot. This is accomplished, for example, by positioning the transducer on the face of a suitable associated display device such as a cathode-ray-tube unit. Signals generated by the transducer are applied to the unit to provide a visual display of the entire graphical representation defined on the surface of the transducer by the light-spot-emitting stylus.

In one specific embodiment of the invention, the visual image provided by the aforementioned display unit is controlled to occur only in spaced-apart time periods during which coordinate-position signals are not being read out of the transducer. During a different interleaved set of time periods, coordinate-position signals are provided by the transducer in response to the writing stylus while the visual image on the display unit is turned off. In that way, interfering signals arising from simultaneous light activation of the photoconductive layer of the transducer are avoided.

In another specific embodiment of the invention, the photoconductive layer is made of a material whose conductivity is selectively lowered in response to light signals from the writing stylus but substantially unaffected in response to light signals from the display unit. In that way, interference in the photoconductive layer arising from signals emanating from the two different light sources is virtually eliminated.

BRIEF DESCRIPTION OF THE DRAWING

A complete understanding of the present invention and of the above and other features thereof may be gained from consideration of the following detailed description presented hereinbelow in connection with the accompanying drawing in which.

DETAILED DESCRIPTION

Figure 1:
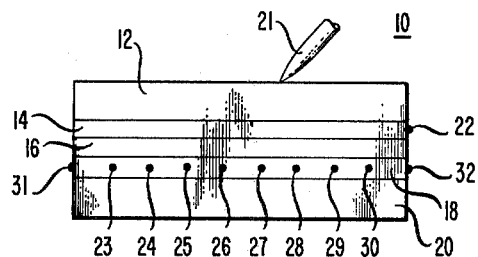
FIG. 1 is a front view of a specific illustrative transducer device made in accordance with the principles of the present invention.

The specific illustrative transducer shown in FIG. 1 comprises a multilayer device 10. From top to bottom, the depicted device includes an optional protective transparent layer 12 made, for example, of a clear plastic about 0.625 to 1.25 millimeters thick; a transparent conductive layer 14 made, for example, of indium oxide about 25 to 250 micrometers thick; a photoconductive layer 16 made, for example, of cadmium sulfide about 25 to 250 micrometers thick; a uniformly resistive layer 18 made, for example, of a standard ceramic or carbon-composition resistive material about 6.25 millimeters thick; and an optional layer 20 made, for example, of a phenol fiber plastic about 12.5 millimeters thick to provide physical support for the other specified layers.

Also shown in FIG. 1 is a standard light-emitting stylus 21 that is adapted to be manually moved by an operator over the top surface of the protective layer 12 to define graphical information thereon. Illustratively, the stylus 21 is a self-contained unit having no connections between itself and the transducer device 10 or to any other instrumentality. Advantageously, the stylus 21 comprises a standard flashlight-like unit including a battery, a bulb and a lens (not shown) designed to produce a light spot about 0.5 millimeters in diameter emanating from the lower end of the unit. Writing on the device 10 is done by moving the light spot to define graphical information.

The transparent conductive layer 14 of FIG. 1 includes an output terminal 22 electrically connected thereto. In addition, the resistive layer 18 includes plural spaced-apart terminals electrically connected along the periphery of the layer. Only terminals 23 through 30 connected to the front edge of the layer 18 and side terminals 31 and 32 thereof are explicitly shown in FIG. 1.

Figure 2:
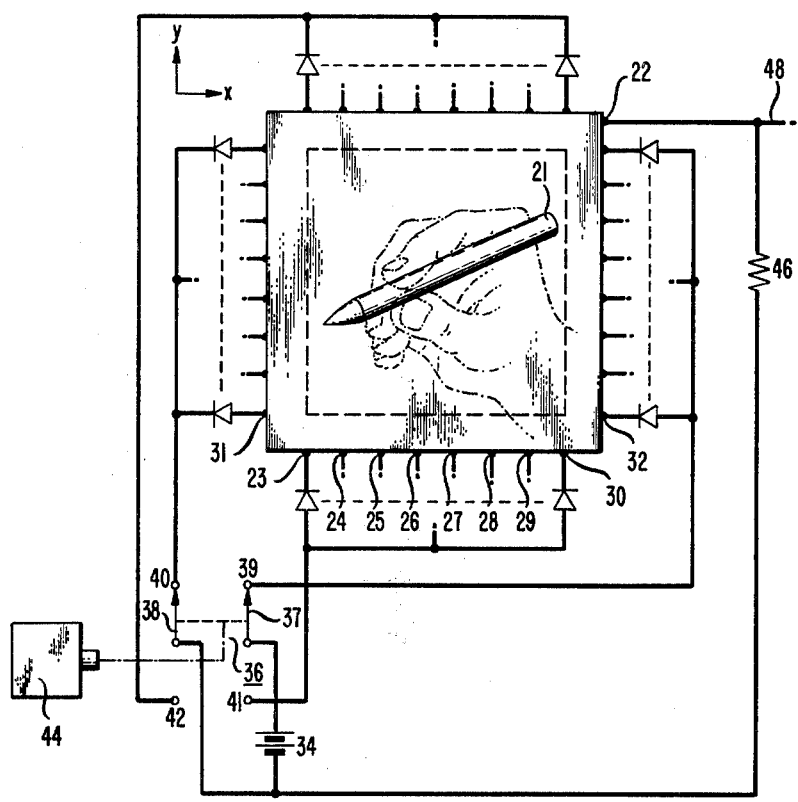
FIG. 2 shows a top view of such a device connected to associated electrical circuitry that is adapted to energize the device and to extract output signals therefrom.

All the peripheral terminals connected to the resistive layer 18, including the aforenoted terminals 23 through 32, are represented in FIG. 2. In turn, these terminals are connected via respective diodes to circuitry adapted to apply operating potentials to the layer 18. In particular, the depicted circuitry is designed to apply x- and y-direction potentials in succession to the layer 18.

The specific illustrative circuitry shown in FIG. 2 includes a battery 34 and a switch assembly 36. The assembly 36 comprises ganged contact arms 37 and 38 which are designed to be in respective contact either with upper terminals 39 and 40 or with lower terminals 41 and 42. In the depicted contact condition, the battery 34 establishes an x-direction potential across the resistive layer 18. On the other hand, when the arms 37 and 38 are moved to contact lower terminals 41 and 42, respectively, a y-direction potential is established across the layer 18.

A standard mechanical actuator 44 is shown in FIG. 2 for moving the arms 37 and 38 between the upper and lower terminals in a high-speed way. Alternatively, a variety of standard electrical signal generators are available to be substituted for the battery 34 and the switch assembly 36 to supply the aforespecified operating potentials to the resistive layer 18. In the particular illustrative embodiment described herein, it is advantageous to perform the indicated x- and y-direction switching at a frequency of, for example, about 60 Hz which in practice is found to be sufficiently high to provide output signals that constitute an accurate replica of hand-written graphical information.

In one specific illustrative example of a transducer device made in accordance with the principles of the present invention, the dimensions of the top surface of the layer 12 shown in FIG. 2 are approximately 30 centimeters by 30 centimeters. In that case, it is advantageous to limit the surface area over which light-spot writing may occur to a smaller central area measuring about 25 centimeters by 25 centimeters. This may be done, for example, simply by forming an opaque border 2.5 centimeters wide around the entire periphery of the top surface shown in FIg. 2. The outline of such a border is indicated in FIG. 2 by dashed lines on the writing surface. Writing is thereby confined to the transparent area within the border. In that way, the linearity of the coordinate-position output signals provided by the device is significantly improved over the case in which writing is permitted to occur in the immediate vicinity of the terminals connected to the resistive layer 18.

In the device shown in FIG. 2, writing or inputting of graphical information is carried out by directing the light spot emanating from the stylus 21 onto the top surface of the layer 12. As the stylus is moved to define a graphical representation (for example, pictorial material or handwriting), the writing light spot propagates through the transparent layers 12 and 14 and impinges on the photoconductive layer 16. In response to light falling upon it, the conductivity of a localized light-spot-defined volume of the photoconductive layer 16 is substantially increased. As a result, the conductive layer 14 is in effect electrically connected to the portion of the resistive layer 18 that directly underlies the light-activated portion of the photoconductive layer. Currents flowing in the resistive layer are thereby diverted via the conductive layer 14 and the output terminal 22 around a part of the resistive layer. When x-direction currents are flowing, the amount of this diversion is directly proportional to the x-direction location of the writing light spot and independent of the y-direction location of the spot. Similarly, when y-direction currents are flowing in the device, the amount of this diversion is directly proportional to the y-direction location of the writing light spot and independent of the x-direction location of the spot.

Circuitry including a resistor 46 is connected to the output terminal 22 of FIG. 2. Successive signals appearing across the resistor 46 constitute x- and y-direction coordinate-position signals which are applied via lead 48 to associated utilization equipment. Such equipment may simply comprise, for example, a standard display terminal at a remote location. The remote terminal may be adapted to respond to the x and y signals transmitted thereto to display a reconstructed replica of the information written into the aforedescribed transducer device or the remote terminal may be a component of a computing system in which the noted x and y signals are to be stored and/or processed in some prescribed manner.

As a practical matter, it is usually desirable that the information being written into the hereindescribed transducer device by the operator-manipulated stylus 21 be viewable by the operator during the writing process. In accordance with specific aspects of the principles of the present invention, this is achieved in a simple manner in several different ways.

Figure 3:
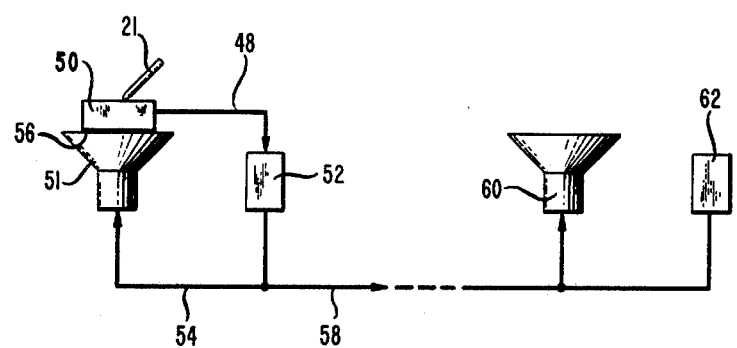
FIG. 3 schematically depicts a device made in accordance with this invention combined with a display device for local viewing and, in addition, connected to a remote terminal at a distant location.

In FIG. 3 an assembly 50 comprising a transducer device and associated circuitry of the specific illustrative type described above is shown positioned in close proximity to a display device 51 which, for purposes of a particular example, will be considered to be a standard cathode-ray-tube display unit. In response to light signals from the writing stylus 21, the assembly 50 generates successive coordinate-position signals that appear on output lead 48, in the manner specified earlier above. These output signals are applied to a standard processing unit 52 that includes a memory. The entire sequence (or, as will be described later below, a sampled subset) of coordinate-position signals representative of the graphical information written by the stylus 21 on the transducer device of the assembly 50 is stored in the unit 52. In turn, the unit 52 applies deflection signals via lead 54 to the cathode-ray-tube unit 51. In a manner well known in the art, these deflection signals are effective to cause a visual replica of the stored signals to appear on the front face 56 of the unit 51. Advantageously, this replica is designed to be a full-size aligned counterpart of the graphical representation defined by the stylus 21.

It is, of course, desired that the visual replica displayed on the face of the unit 51 of FIG. 3 be viewable by an operator who is positioned to the right of the assembly 50. To permit this, all of the layers of the transducer device thereof must be transparent to light emitted from the visual display provided by the unit 51. The aforespecified layers 12, 14, 16 and 20 described above in connection with FIG. 1 already exhibit such transparency to a satisfactory extent with respect to the wavelengths of light emitted from typical phosphor coatings utilized in cathode-ray-tube display units. But, to enhance its transparency, the aforedescribed resistive layer 18 should be replaced with, for example, a layer of indium-tin oxide about one micrometer thick. Other known transparent resistive materials such as silver are also suitable.

To provide a satisfactory display of what has already been written into the assembly 50 of FIG. 3, it is, of course, also necessary that interference be avoided in the photoconductive layer 16 (FIG. 1) between light signals from the stylus 21 and light signals emanating from the phosphor coating in the display unit 51. In accordance with aspects of the principles of the present invention, this is accomplished in either of two specific advantageous ways.

In accordance with one approach, the visual display provided by the unit 51 of FIG. 3 is turned off during the time in which coordinate-position signals appearing on the output lead 48 are sensed by the processing unit 52. Thus, for example, assume that the unit 51 is controlled to operate in a standard raster-scan television-type display mode and, furthermore, assume that a standard short-persistence phosphor is coated on the inner surface of the display face of the unit 51. In that case, the display is blanked during each flyback interval of the raster-scan mode of operation. And only during each such blanked interval are the coordinate-position signals appearing on the output line 48 sampled by the processing unit 52. Accordingly, the signals sampled by the unit 52 are only those attributable to the light spot emanating from the stylus 21. In one particular illustrative case, both this sampling and the noted blanking action occur sixty times per second. This is typically fast enough to provide a sufficient number of coordinate-position signals per second to enable the movement of a hand-held stylus to be faithfully reproduced. In addition, at that blanking rate the human eye does not see the interruptions in the visual display on the face of the unit 51.

In accordance with a second approach encompassed by the principles of the present invention, the photoconductive material of the layer 16 (FIG. 1) is selected to have a spectral response such that its conductivity is substantially lowered by light from the stylus 21 but is substantially unaffected by light from the face of the display unit 51. Thus, for example, if the layer 16 is made of cadmium sulfide and if the frequencies of the light from the stylus and the phosphor coating are selected to be shorter than 500 angstroms (blue light) and longer than 500 angstroms (red light), respectively, the light from the display unit will not substantially lower the conductivity of the layer 16 but the stylus light will. In that case, of course, the aforedescribed sampling technique applied to signals appearing on the output line 48 need not be utilized.

As specified above, signals provided by the processing unit 52 of FIG. 3 are applied to the unit 51 to provide a local display of information defined in the assembly 50 by the light-spot-emitting stylus 21. These same signals may also be applied by the unit 52 to a link 58 for transmission to a remote location. At the remote location, another display unit such as, for example, a cathode-ray-tube unit 60 may be employed to provide a visual replica of the graphical representation defined by the stylus 21. Alternatively or concurrently, the signals transmitted to the remote location may be applied to a unit 62 for processing and/or storage.

Figure 4:
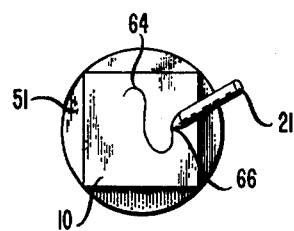
FIG. 4 is a front view of a transducer device combined with a local display device.

In FIG. 4, a transparent transducer device 10 made in accordance with the principles of this invention is shown positioned in close proximity to the face of display unit 51. In the particular manner described in detail earlier above, the past trajectory 64 of the light spot emitted by the stylus 21 is visually displayed on the unit 51 for viewing by an operator of the device. Spot 66 marks the present position of the stylus 21.

Finally, it is to be understood that the above-described arrangements are only illustrative of the principles of the present invention. In accordance with those principles, numerous modifications and alternatives may be devised by those skilled in the art without departing from the spirit and scope of the invention. For example, the processing unit 52 of FIG. 3 may be adapted to apply signals to the display unit 51 that are substitutes for or in addition to the aforespecified replica signals. Thus, for instance, if a signature is written into the assembly 50 by an operator utilizing the stylus 21, the unit 52 can be programmed to compare the written signature with a list of authorized signatures and in response to the comparison to provide an indication thereof on the face of the display unit 51.

Moreover, although primary emphasis herein has been directed to a transducer device and associated apparatus adapted to be utilized in conjunction with an operator-held stylus, it is, of course, apparent that the device is also suited for other light-spot-tracking applications. Thus, for example, the device can be utilized to track the movement of a light spot emanating from a moving component of a piece of equipment whose mechanical behavior is being monitored.

I claim:
1. A transducer device (10) adapted to be activated by a light-spot-emitting stylus (21), said device being characterized by
   a photoconductive layer (16) sandwiched between a transparent conductive layer (14) and a resistive layer (18).
2. A device as in claim 1 further comprising an output terminal (22) electrically connected to said conductive layer,
   and multiple spaced-apart terminals (23 through 32 . . . ) electrically connected to said resistive layer along the periphery thereof.
3. A device as in claim 2 still further including
   means (34, 36, 44) connected to said spaced-apart terminals for successively applying x- and y-direction potentials to said resistive layer.
4. In combination in a system for providing electrical signals representative of the successive coordinate posi- tions of a writing stylus and for providing a visual display of graphical information written by said stylus,
 a transducer device adapted to be activated by a light-spot-emitting stylus, said device comprising
  a photoconductive layer sandwiched between a transparent conductive layer and a resistive layer,
  an output terminal electrically connected to said conductive layer,
  multiple spaced-apart terminals electrically connected to said resistive layer along the periphery thereof,
  and means connected to said spaced-apart terminals for successively applying x- and y-direction potentials to said resistive layer,
 a display unit positioned in close proximity to said transducer device for providing a visual display of graphical information written by said stylus on said device,
 and a processing unit connected to said output terminal for storing coordinate-position signals provided by said device and for applying said signals to said display unit.

5. A combination as in claim 4 wherein the light emitted by said stylus and the light emitted by said display unit are respectively characterized by different wavelength ranges and wherein the photoconductive layer is made of a material that responds to the stylus light by substantially increasing its conductivity but that does not substantially alter its conductivity in response to light from the display unit.

6. A combination as in claim 4 wherein said display unit is characterized by a low persistence and a raster-scan mode of operation including flyback intervals during which said unit is blanked,
 and wherein said processing unit connected to said output terminal samples said coordinate-position signals provided by said device only during successive flyback intervals.

7. A combination as in claim 4 further including
 a transmission link connected to said processing unit for propagating signals provided thereby to a remote location,
 and a unit connected to said link at said remote location for receiving said propagated signals.

8. A combination as in claim 7 wherein the unit at said remote location is a display unit for providing in real time a visual display at said remote location of the graphical information written by said stylus on said device.

9. A combination as in claim 7 wherein the unit at said remote location is a memory unit for storing said propagated signals.

* * * * *